United States Patent [19]

Clemens

[11] Patent Number: 5,175,724
[45] Date of Patent: Dec. 29, 1992

[54] CAPACITANCE DISC INFORMATION RETRIEVAL SYSTEM

[75] Inventor: Jon K. Clemens, Palo Alto, Calif.

[73] Assignee: New Visions Technologies, Inc., Minneapolis, Minn.

[21] Appl. No.: 719,364

[22] Filed: Jun. 24, 1991

[51] Int. Cl.$^5$ .................. G11B 21/16; G11B 3/10
[52] U.S. Cl. .................. 369/256; 369/170; 369/249
[58] Field of Search ........... 369/246, 247, 248, 215, 369/219, 223, 244, 256, 249, 170

[56] References Cited

U.S. PATENT DOCUMENTS

| | | | |
|---|---|---|---|
| 4,079,943 | 3/1978 | Morita et al. | 369/248 X |
| 4,120,504 | 10/1978 | Brecht | 369/249 |
| 4,151,998 | 5/1979 | Kurtin et al. | 369/248 X |
| 4,364,121 | 12/1982 | Stewart | 369/256 |
| 4,418,408 | 11/1983 | Taylor | 369/170 |
| 4,462,097 | 7/1984 | Janada et al. | 369/248 |
| 4,587,646 | 5/1986 | Graham | 369/248 |

OTHER PUBLICATIONS

H. N. Crooks, "The RCA SelectaVision Video Disc System" *RCA Engineer*, vol 26-9, Nov./Dec., 1981, pp. 10-12.

K. C. Kelleher "The Video Disc Signal Retrieval System" *RCA Engineer*, vol. 26-9, Nov./Dec. 1981.

*Primary Examiner*—Eugene R. LaRoche
*Assistant Examiner*—Christopher R. Glembocki
*Attorney, Agent, or Firm*—Donald S. Cohen

[57] ABSTRACT

A system for retrieving information on a random basis from a disc having the information thereon in a spiral path around the disc. The system includes a turntable rotatable about a central spindle and adapted to support the disc thereon. An arm housing is fixedly mounted over the turntable and contains printed circuit boards having some of the electrical circuitry for the system. Also in the arm housing is a rectangular frame like cartridge holder which supports a cartridge having a stylus therein. The stylus is adapted to ride on the disc to read out the information from the disc. A piston is connected to the cartridge holder and extends through the arm housing. A motor is connected to the piston and is adapted to move the piston so that the cartridge holder is moved with respect to the arm housing and the stylus moves radially along the disc. The motor moves the stylus over the short distance of the radius so as to quickly and easily obtain random access to the information in the disc.

16 Claims, 2 Drawing Sheets 5,175,724

CAPACITANCE DISC INFORMATION RETRIEVAL SYSTEM

FIELD OF THE INVENTION

The present invention relates to an information retrieval system, and, more particularly, to a capacitance disc system having fast access.

BACKGROUND OF THE INVENTION

There has developed a need for systems for storing and retrieving large amounts of information, particularly for use in computers. In the television industry there has been developed a system for storing and retrieving large amounts of video and audio information known as the video disc. The video disc is a flat plastic disc having the information stored thereon in the form of spaced grooves arranged along a spiral path. Two playback systems have been developed for the video disc. One system uses a laser for reading the grooves in the disc, and the other system uses a needle like stylus riding in a spiral groove in the disc which has the information grooves at the bottom thereof. The laser system has the advantage that it does not ride on the disc. Therefore, it can be easily and quickly moved along the disc for ease of random access to the information in the disc. However, it has the disadvantage that it requires a complex optical system and mechanical controls for moving the laser over the disc in proper relation to the information in the disc. The stylus system has the advantage that it is of simpler construction since the stylus follows the path of the information grooves by riding in the spiral groove containing the information grooves. However, it has the disadvantage that it is difficult to achieve random access to the information in the disc. This results partially from the fact that the discs used for video are relatively large, 12 inches in diameter, requiring movement of the stylus over a relatively large distance, about 3 inches. Also, the stylus rides in the spiral groove so that it is difficult to move the stylus quickly across the radius of the disc, and the stylus is supported on a relatively large arm which carries the stylus radially across the disc and is difficult to move quickly. Such a stylus system is described in U.S. Pat. No. 4,364,121 to M. C. Stewart, issued Dec. 14, 1982, entitled "Pickup Cartridge for Video Disc Player", U.S. Pat. No. 4,418,408 to B. K. Taylor, issued Nov. 29, 1983, entitled "Stylus Arm for Video Disc Player", and the article of K. C. Kelleher et al., entitled "The Video-Disc signal retrieval system", published RCA ENGINEER, Vol. 26-9, Nov./Dec 1981, pgs. 30-37. Because of the relative simplicity of the stylus system, it would be desirable to have such a system for use in storing information for computers but which would allow ease of random access to the information in the disc which is essential for computer use.

SUMMARY OF THE INVENTION

The present invention relates to an information storage and retrieval system which includes an arm fixedly mounted over an information disc support. A stylus is mounted in the arm and is adapted to ride in a groove in the information disc mounted on the support. Means is provided for moving the stylus with respect to the arm in a direction radially along the disc to allow for random access of the information in the disc.

More particularly, the information and retrieval system includes means for supporting and rotating a flat disc having information therein along a spiral path. Over the disc support is means for supporting a stylus and means for moving only the stylus along the radius of the disc when the disc is on the support means.

DETAILED DESCRIPTION

Figure 1:
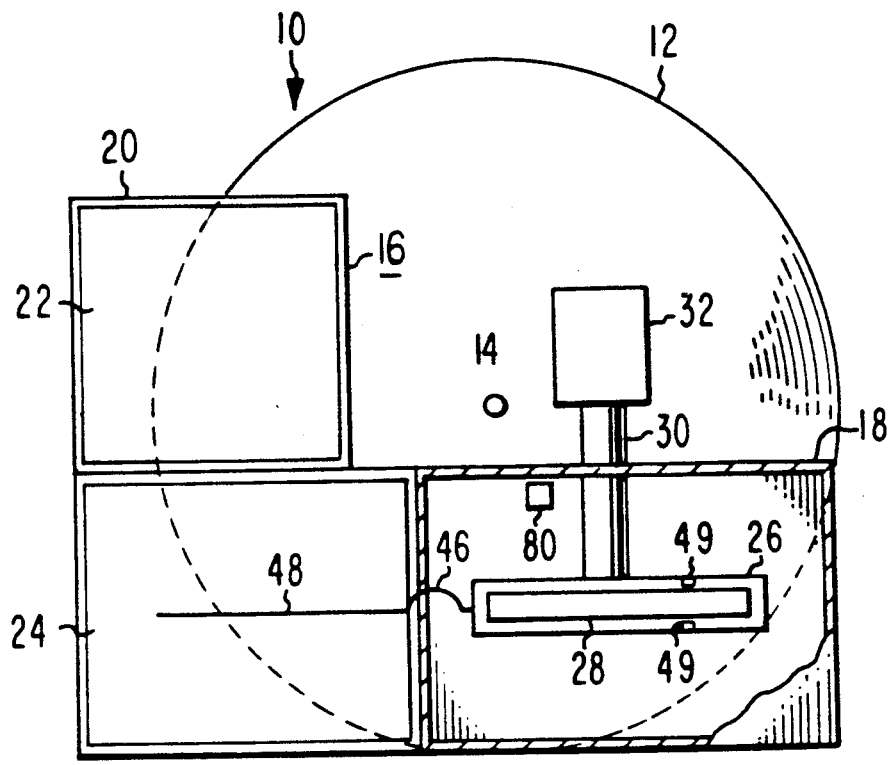
FIG. 1 is a top plan view of a portion of an information storage and retrieval system which incorporates the present invention.

Referring initially to FIG. 1, there is shown a portion of the information storage and retrieval system 10 of the present invention. System 10 includes a flat turntable 12 adapted to rotate about a central spindle 14 and adapted to support an information carrying disc, not shown, thereon. The disc is of the type described in the article of H. N. Crooks, entitled "The RCA 'Selectivision' VideoDisc System", published in RCA ENGINEER, Vol. 26-9, Nov.–Dec. 1981, pgs. 10-12. However, for use in a computer, the disc is preferably of a diameter no greater than about 3.5 inches with about 1 inch of the radius containing the information containing grooves. The turntable 12 is provided with suitable drive means, not shown. The turntable 12 and its drive means are contained in a suitable housing, not shown, such as shown in the previously referred to U.S. Pat. No. 4,418,408.

An arm housing 16 extends over and across the turntable 12, and is fixedly mounted in the housing. The arm housing 16 is L-shaped having a leg 18 and a shorter foot 20. As shown in the previously referred to article of K. C. Kelleher et al, the arm housing 16 has a top wall and side walls extending downwardly from the top wall so that the arm housing 16 has an open bottom facing the turntable 12. Within the foot 20 and the portion of the leg 18 adjacent the foot 20 are circuit boards 22 and 24 respectively which contain circuits for converting the signal from a stylus to an operating signal for the system. Such circuits are described in the article of K. C. Kelleher and form no part of the present invention. In the end of the leg 18 is a cartridge holder 26 containing a stylus cartridge 28. The cartridge holder 26 is mounted on the end of a piston 30 which extends through a wall of the arm housing 16 to a positioning motor 32. The motor 32 is adapted to move the cartridge holder 26 radially across a disc on the turntable 12.

Figure 2:
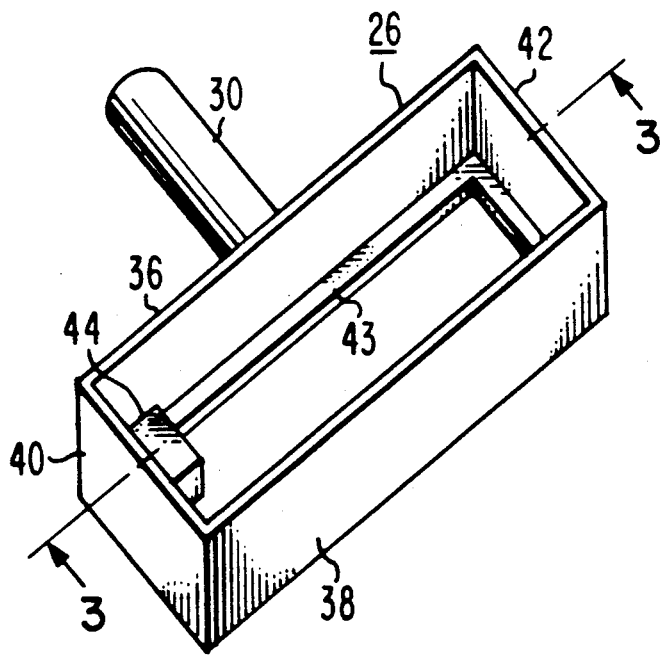
FIG. 2 is a perspective view of the cartridge holder for the system of the present invention.
Figure 3:
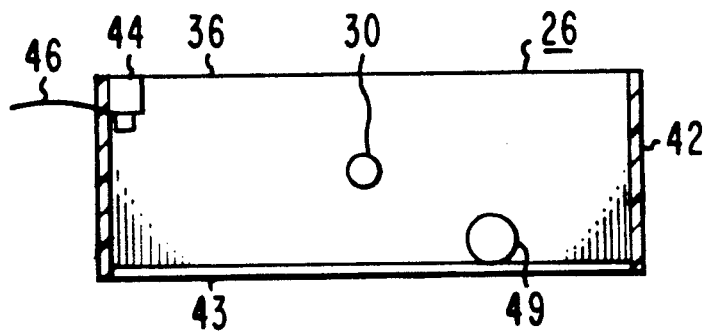
FIG. 3 is a sectional view taken along line 3—3 of FIG. 2.

As shown in FIGS. 2 and 3, the cartridge holder 26 is a rectangular frame having a pair of parallel side walls 36 and 38 and end walls 40 and 42. Short ledges 43 extend inwardly from the bottom ends of the side walls 36 and 38. The top and bottom of the cartridge holder 26 is open. The side walls 36 and 38 are longer than the end walls 40 and 42 so that the cartridge holder 26 is longer than it is wide. The cartridge holder 26 is preferably made of a plastic so as to be light in weight. Within the cartridge holder 26 at the top of the end wall 40 is a contact button 44 which projects downwardly from the top edge of the end wall 40. The contact button 44 may be made entirely of a conductive material, such as a metal, or can be of a plastic having a metal film on its bottom surface. One end of a flexible metal wire flylead 46 extends through the end wall 40 and is bonded to the contact button 44 so as to be mechanically and electrically connected to the contact button 44. The other end of the flylead 46 is bonded to a strip line 48 on the circuit board 24. Within the cartridge holder 26 and at each side wall 36 and 38 adjacent the end wall 42 is a separate skipper coil 49. Each of the skipper coils 49 is an aircore coil and the two coils 49 are electrically connected together by a fine flexible wire, not shown, extending across the inner surface of the end wall 42. The piston 30 has one end secured to the side wall 36 of the cartridge holder 26.

Figure 4:
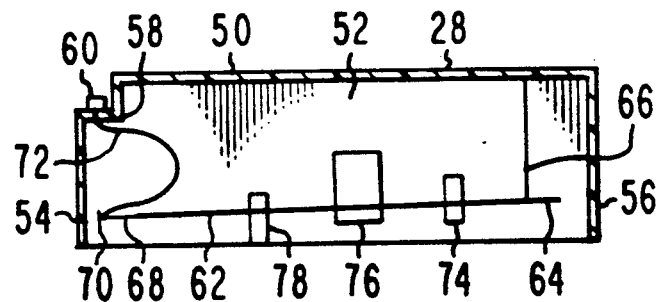
FIG. 4 is a sectional view of a stylus cartridge for the system of the present invention.

As shown in FIG. 4, the cartridge 28 is rectangular and of a size to fit within the cartridge holder 26. The cartridge 28 includes a top wall 50, a pair of parallel side walls 52 (only one of which is shown), and a pair of end walls 54 and 56. The bottom of the cartridge 28 is open. The cartridge 28 is also preferably made of a plastic so as to be of light weight. The top wall 50 has a depressed ledge 58 at its junction with the end wall 54. A contact button 60 of a conductive material, such as a metal, is on the ledge 58 and is adapted to make electrical contact with the contact button 44 in the cartridge holder 26 when the cartridge 28 is within the cartridge holder 26. Within the cartridge 28 and extending longitudinally therealong between the end walls 54 and 56 is a stylus arm 62. The stylus arm 62 is of a construction similar to that of the stylus arm shown in the U.S. Patent No. 4,364,121 to M. C. Stewart. The stylus arm 62 is supported from the top wall 50 near its back end 64 adjacent the end wall 56 by a flexible support arm 66. The flexible support arm 66 allows the front end 68 of the stylus arm 62 to move up and down in the cartridge 28. A stylus 70 is mounted on the front end 68 of the stylus arm 62. The stylus 70 is of the type shown in U.S. Pat. No. 4,364,121 which is a piece of diamond having a pointed end which rides in the groove in the disk and a metal film on a surface thereof which form one plate of a capacitor with the disc. A flexible, spring-like, metal coated plastic flylead 72 has one end connected to the metal film on the stylus 70 and its other end connected to the connector button 60. A skipper magnet 74 is on the stylus arm 62 adjacent its back end 64. On the inner surfaces of the side walls 52 are handling springs 76. The handling springs 76 hold the stylus arm 62 up within the cartridge 28 when the cartridge 28 is not in the cartridge holder 26, but release the stylus arm 62 when the cartridge 28 is placed in the cartridge holder 26 so that the front end 68 of the stylus arm 62 can drop down to place the stylus 70 on the disc. Also in the cartridge 28 on each side of the stylus arm 62 are bumpers 78 of a flexible material which limit lateral movement of the stylus arm 62.

Figure 5:
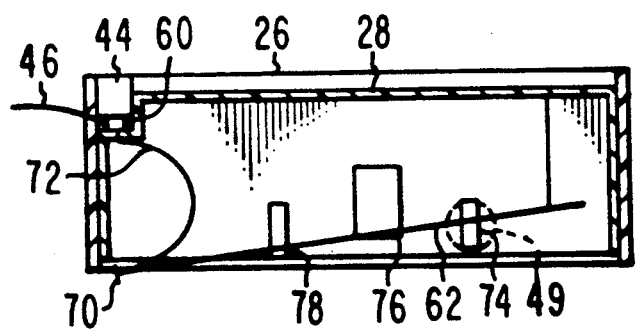
FIG. 5 is a sectional view of a cartridge holder containing a stylus cartridge.

As shown in FIG. 5, the cartridge 28 is inserted in the cartridge holder 26 through the open top of the cartridge holder 26 until the cartridge 28 rests on the ledges 43 and with the contact button 60 on the ledge 58 of the cartridge 28 making contact with the contact button 44 in the cartridge holder 26. This electrically connects the stylus 70 through the flylead 72, contact buttons 60 and 44, flylead 46 and stripline 48 to the circuitry within the arm housing 16. The skipper magnet 74 on the stylus arm 62 is positioned between the skipper coils 49 so that it can be operated by the skipper coils 49. As previously stated, when the cartridge 28 is inserted in the cartridge holder 26, the holding springs 76 release the stylus arm 62 so that the front end 68 of the stylus arm 62 can drop downwardly under the action of the spring-like flylead 72 to bring the stylus 70 into riding engagement with a disc. The cartridge 28 can be inserted into and removed from the cartridge holder 26 through a door, not shown, in the top of the arm housing 16.

In the operation of the information retrieval system 10, a disc having the desired information thereon is placed on the turntable 12. The disc is of the type described in the article of H. N. Crooks, entitled "The RCA 'SelectaVision' VideoDisc System", published in RCA ENGINEER, Vol. 26-9, Nov./Dec. 1981, pgs. 10-12, but of much smaller diameter. The diameter of the disc is compatible with standard computer discs, preferably about 3.5". The system 10 is turned on to rotate the turntable 12 and the disc and to bring the stylus 70 into the spiral groove in the disc. To place the stylus 70 in the appropriate position along the disc to achieve the desired information, the motor 32 is operated to move the cartridge holder 26 and the cartridge 28 radially along the disc. The normal position for the cartridge holder 26 is about half way along the radius of the disc. Thus, the motor 32 moves the cartridge holder 26 radially inwardly or outwardly to place the stylus 70 in the desired position on the disc. Since the radial length of the portion of the disc containing the recorded information is very short, about 1", the cartridge holder 26 only has to be moved a very short distance to be placed in any desired position on the disc. Also, since only the cartridge holder 26 and cartridge 28 are being moved, and they only have to be moved a short distance, the stylus 70 can be moved quickly to the desired location on the disc. Thus, the system 10 provides for random access of the information on the disc with ease and quickness.

As shown in FIG. 1, a stylus lift off ramp 80 is provided in the arm housing 16 along the line of travel of the cartridge holder 26 and at the inner end of the radius of the disc. Thus, when the system 10 is to be turned off or the disc changed, the motor 32 moves the cartridge holder 26 radially inwardly until the stylus 70 runs up the ramp 80. This lifts the stylus 70 off the disc. When the system 10 is turned on, the motor 32 moves the cartridge holder 26 radially outwardly to remove the stylus 70 from the ramp 80 and drop it back onto the disc.

The skipper coils 49, which are located at opposite sides of the skipper magnet 74 on the stylus arm 62, are used to apply a magnet force onto the skipper magnet 74. This applies the proper lateral influence to the stylus arm 62 for forward and reverse scanning and to correct tracking errors that may occur because of minute disc defects. The stylus 70 is electrically connected to the operating circuitry of the system 10 through the flexible flylead 46 between the cartridge holder 26 and the stripline 48. However, the flylead 46 is very flexible in the direction of movement of the cartridge holder 26 so that it does not adversely affect the movement of the cartridge holder 26.

Thus, there is provided by the present invention an information retrieval system using a capacitance type information storage disc which permits random access to the information in the disc quickly and easily. In the system 10 of the present invention, the stylus cartridge is mounted in a cartridge holder which is supported in an arm housing so that only the stylus cartridge and cartridge holder is moved radially along the information storage disc by a motor. Since both the cartridge holder and stylus cartridge and small and light in weight they can be moved quickly along the disc to achieve the fast random access time.

I claim:

1. An information retrieval system comprising:
   means for supporting and rotating a flat disc having information therein along a spiral path;
   an arm housing fixedly mounted above and extending across the disc supporting means and loosely supporting therein a stylus over the disc supporting means;
   a piston extending through the arm housing and connected at one end within the arm housing to the stylus; and
   means connected to the other end of the piston outside the arm housing as the sole means for moving the piston and the stylus with respect to the arm housing along the radius of the disc when the disc is on its supporting means.

2. The system of claim 1 in which the disc supporting means comprises a circular turntable rotatable about a central spindle.

3. The system of claim 2 in which the stylus is mounted in a cartridge.

4. The system of claim 3 including a cartridge holder within the arm housing and holding the stylus cartridge, and the piston is connected to the cartridge holder.

5. The system of claim 4 in which the cartridge holder is a rectangular frame having spaced parallel side walls, end walls connecting the side walls and a ledge extending inwardly from the bottom edge of the side walls with the top and bottom being open, and the stylus cartridge fits in the cartridge holder and is seated on the ledge with the stylus in the stylus cartridge projecting from the bottom of the cartridge holder 6. The system of claim 5 in which the cartridge holder and stylus cartridge have mating contact buttons, a flexible wire flylead is electrically connected between the stylus and the contact button on the stylus cartridge, and a flexible wire flylead is electrically connected between the contact button on the cartridge holder and electrical circuitry in the arm housing.

7. The system of claim 6 wherein the stylus cartridge is rectangular having a top wall, spaced side walls and spaced end walls with the bottom being open, a stylus arm is within the stylus cartridge and extends longitudinally therealong, the stylus arm is flexibly connected adjacent one end to the stylus cartridge and the stylus is on the other end of the stylus arm.

8. The system of claim 7 wherein the stylus cartridge includes flexible bumpers therein at opposite sides of the stylus arm to limit lateral movement of the stylus arm between the side wall of the stylus cartridge.

9. An information retrieval system comprising:
   a circular turntable rotatably mounted about a central spindle;
   an arm housing fixedly mounted over the turntable and open at its bottom side facing the turntable;
   a stylus cartridge holder loosely mounted in said arm housing over said turntable;
   a piston extending through and into the arm housing, the end of the piston within the arm housing being connected to the stylus cartridge; and
   means connected to the other end of the piston outside the arm housing as the sole means for moving the piston and said cartridge holder with respect to said arm housing radially along said turntable.

10. The system of claim 9 in which the means for moving said cartridge holder comprises a motor connected to the other end of the piston for moving the piston.

11. The system of claim 10 in which the cartridge holder is a rectangular frame having spaced parallel side walls, end walls connecting the side walls and a ledge projecting inwardly from the bottom edge of the side walls with the top and bottom of the frame being open.

12. The system of claim 11 including a stylus cartridge mounted in the cartridge holder and seated on the ledge, and stylus in the stylus cartridge and projecting from the cartridge toward the turntable.

13. The system of claim 12 in which the cartridge holder and stylus cartridge having mating contact buttons, a flexible wire flylead is electrically connected between the stylus and the contact button on the stylus cartridge, and a flexible wire flylead is electrically connected between the contact button on the cartridge holder and electrical circuitry in the arm housing.

14. The system of claim 13 wherein the stylus cartridge is rectangular having a top wall, spaced side walls and spaced end walls with the bottom being open, a stylus arm is within the stylus cartridge and extends longitudinally therealong, the stylus arm is flexibly connected adjacent one end to the stylus cartridge and the stylus is on the other end of the stylus arm.

15. The system of claim 14 wherein the stylus cartridge includes flexible bumpers therein at opposite sides of the stylus arm to limit lateral movement of the stylus arm between the side walls of the stylus cartridge.

16. The system of claim 14 including a ramp on the arm housing at one end of the radial path of the stylus, the ramp adapted to lift the stylus upwardly away from the turntable when the stylus is moved onto the ramp.

* * * * *